UNITED STATES PATENT OFFICE.

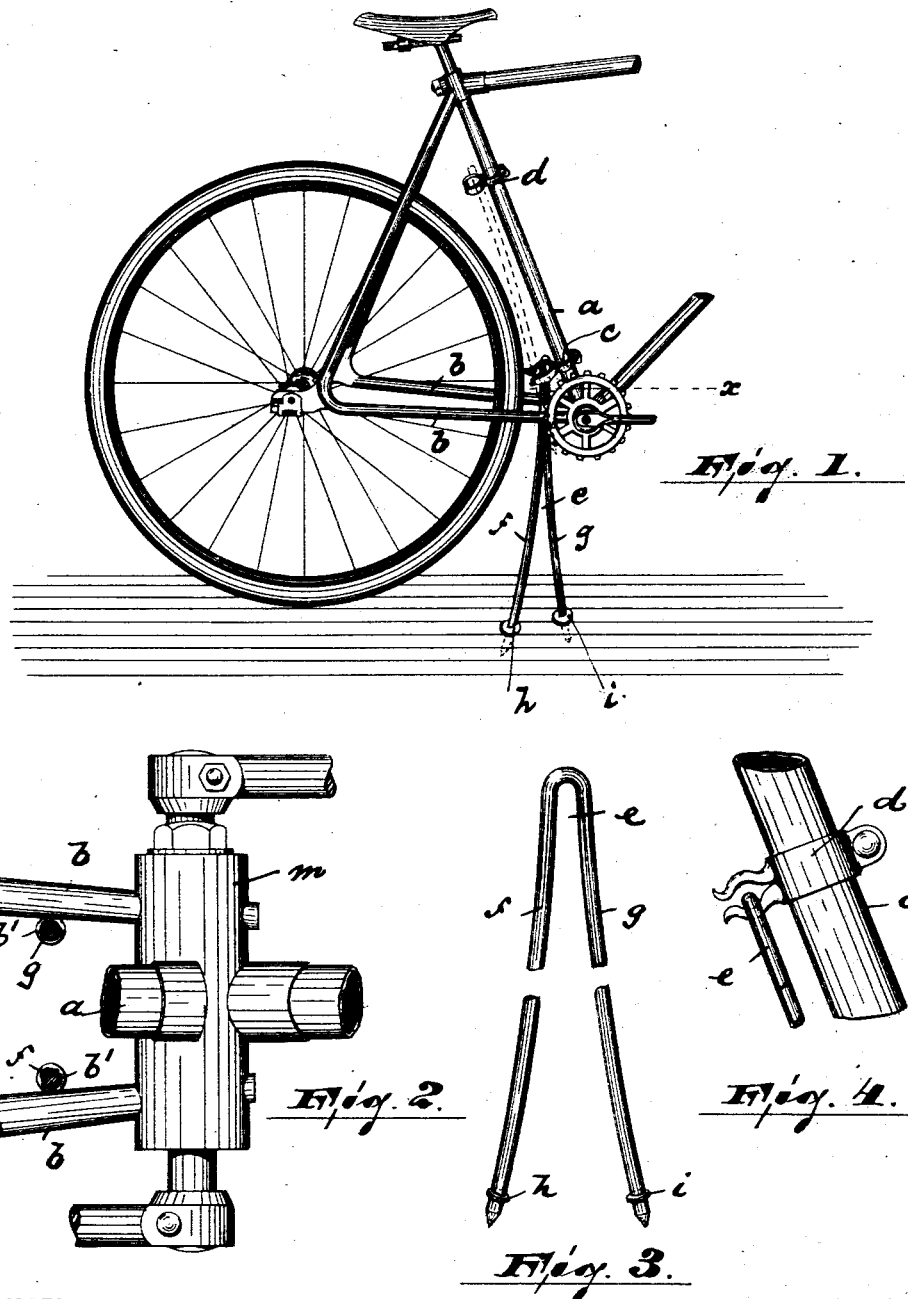

FREDRICK CH. HALBACH, OF PATERSON, NEW JERSEY.

BICYCLE-SUPPORT.

SPECIFICATION forming part of Letters Patent No. 525,457, dated September 4, 1894.

Application filed April 24, 1894. Serial No. 508,791. (No model.)

*To all whom it may concern:*

Be it known that I, FREDRICK CH. HALBACH, a citizen of the United States, residing in Paterson, county of Passaic, and State of New Jersey, have invented certain new and useful Improvements in Bicycle-Supports; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a support for bicycles of simple, strong, light and durable construction, reliable in operation and easily handled.

The invention consists in the improved bicycle support and in the combination and arrangements of parts substantially as will be hereinafter more fully described and claimed.

In the drawings, Figure 1 is a perspective view of a portion of a bicycle having my improved support attached thereto. Fig. 2 is an enlarged detail sectional view on the line *x* of Fig. 1; Fig. 3. an enlarged view of the support detached, and Fig. 4 a detail view illustrating one way of attaching the support, when not in use, to a clasp hook arranged on the brace of the frame.

In said drawings *b*, *b* represents the lower rear portions of a diamond frame machine, *a* the brace thereof and *m* the crank shaft bearing. On the inner side of each of the lower portions *b* of the frame is arranged a guide or eyelet *b'* adapted to receive and guide the legs *f* and *g* of the support *e*, which latter is substantially of an inverted V shape when in use or operation, and is made—by preference—of spring steel. The lower portions of the legs *f* and *g* are pointed and are provided with collars *h* and *i* respectively. Secured to the brace *a* and a short distance above the crank bearing *m* is a spring clasp *c* adapted to receive and hold the upper portion of the support *e*, when in use. A second spring clasp *d* or clasp hook *d'* (see Fig. 4) is arranged at or near the upper end of the brace *a* and is adapted to hold the support in its raised position, as illustrated in dotted lines in Fig. 1.

As above described, when the support is not in use, its upper portion is either hooked on the hook clasp *d'* or is sprung between the spring clasp *d*, while the collars *h* and *i* of the legs *f* and *g* bear against the under side of the eyelets *b'*, thus holding the said support in a firm position and preventing it from rattling or getting loose.

When the support is to be used, for steadying the bicycle, its upper portion is first disengaged from the hook or clasp and its legs are slid and forced downward (through the eyelets) when they will by their latent spring power diverge, and their pointed ends will enter the floor or ground. In that position the upper portion of the support *e* is firmly held between the spring clasp *c*. The collars *h* and *i* will prevent the legs *f* and *g* from entering the ground too far. The legs of the support are of sufficient length, that when rested on the ground, will raise the rear wheel of the bicycle and thus allow it to be rotated and cleaned.

I do not intend to limit myself to the precise construction shown and described as alterations can be made without changing the scope of my invention.

Having thus described my invention, what I claim as new, and desire to secure by Letters Patent, is—

1. In a bicycle the combination with the frame, of eyelets arranged on the inner side of the frame and a substantially inverted V-shaped support guided with its legs in said eyelets, substantially as and for the purposes described.

2. In a bicycle, the combination with the frame and its brace, of eyelets arranged on the inner side of the frame, a substantially inverted V-shaped support arranged in said eyelets, and an upper and lower spring clasp arranged on said brace and adapted to hold said support in its raised and normal position respectively, substantially as described.

3. In a bicycle, the combination of the frame, with eyelets on said frame, a substantially inverted V-shaped support consisting of two spring legs arranged in said eyelets, a collar at or near the lower end of each leg, and means for holding said support in its raised and normal position respectively, substantially as described.

In testimony that I claim the foregoing I have hereunto set my hand this 19th day of April, 1894.

FREDRICK CH. HALBACH.

Witnesses:
ALFRED GARTNER,
WM. D. BELL.